United States Patent [19]
Nomura et al.

[11] Patent Number: 5,762,879
[45] Date of Patent: Jun. 9, 1998

[54] REACTION HEAT CONTROL MECHANISM OF HEAT EXCHANGE AREA REGULATION TYPE IN A CHEMICAL REACTION APPARATUS

[75] Inventors: Mamoru Nomura, Fukui; Nobuo Ashizawa, Mikunihigashi, both of Japan

[73] Assignee: Todoroki Sangyo Kabushiki Kaisha, Fukui, Japan

[21] Appl. No.: 433,512

[22] PCT Filed: Dec. 20, 1994

[86] PCT No.: PCT/JP94/02145

§ 371 Date: May 11, 1995

§ 102(e) Date: May 11, 1995

[87] PCT Pub. No.: WO95/01959

PCT Pub. Date: Jan. 19, 1995

[30] Foreign Application Priority Data

Nov. 2, 1994 [JP] Japan .................... 6-269731

[51] Int. Cl.$^6$ .................. G05D 23/00; F28D 21/00
[52] U.S. Cl. .................. 422/109; 422/110; 422/202; 422/203; 165/301
[58] Field of Search .................. 422/107, 106, 422/109, 110, 198, 200, 202, 203; 165/301

[56] References Cited

U.S. PATENT DOCUMENTS

| | | | |
|---|---|---|---|
| 4,714,592 | 12/1987 | Zanma et al. | 422/192 |
| 4,721,575 | 1/1988 | Binning et al. | 210/761 |
| 4,803,054 | 2/1989 | Sillerud et al. | 422/109 |
| 5,225,166 | 7/1993 | Zarian et al. | 422/109 |
| 5,380,485 | 1/1995 | Takahashi et al. | 422/62 |

FOREIGN PATENT DOCUMENTS

| | | |
|---|---|---|
| 5-104002 | 4/1993 | Japan . |
| 0415618 B1 | 12/1994 | Japan . |

*Primary Examiner*—Nina Bhat
*Attorney, Agent, or Firm*—Ronald R. Snider

[57] ABSTRACT

The present invention relates to a reaction heat control mechanism of heat exchange area regulation type in a chemical reaction apparatus comprising: a reaction vessel for receiving a liquid agent to be reacted therein; a heater; a cooling jacket acting as an airtight vessel in and out of which a cooling medium flows; a temperature controller; and a cooling medium liquid-level controller acting as a supply and exhasut change mechanism for changing and regulating a volume of gas in the cooling jacket, said liquid level controller controlling the reaction heat of the liquid agent in the reaction vessel by increasing or decreasing a contact area of the cooling medium in the cooling jacket with the outer surface of the reaction vessel, and it can even control chemical reaction experiencing sudden temperature change in the reaction vessel in a quick and stable manner.

3 Claims, 4 Drawing Sheets

FIG.4

REACTION HEAT CONTROL MECHANISM OF HEAT EXCHANGE AREA REGULATION TYPE IN A CHEMICAL REACTION APPARATUS

FIELD OF THE INVENTION

The present invention relates to the mechanism to control heat of reaction by automatically regulating heat exchange area in a chemical reaction apparatus or more specifically, practical heat of reaction control mechanism of heat exchange area regulation type in a chemical reaction apparatus which can not only quickly and stably control heat of reaction generated by chemical reaction of a liquid agent in a reaction vessel by changing a contact area between an exterior surface of the vessel and a cooling medium in a cooling jacket surrounding the circumference of the vessel in which the liquid agent is received but also simply and properly control a liquid level of the cooling medium contained in the cooling jacket without need to have a complex structure, and especially it serves to safely control sudden temperature change of the chemical reaction.

BACKGROUND OF THE INVENTION

As we know, in the experiments accompanying chemical reaction such as polymerization or condensation, since the speed of chemical reaction largely depends on the external conditions such as temperature, pressure, concentration and others, it is necessary to properly and quickly regulate those various conditions according to the characteristics of the type of chemical reaction. Especially, in the case of exothermic chemical reaction, since its reaction rate in most cases changes sensitively to the temperature, it invites a dangerous situation unless the temperature especially among others is regulated within an appropriate range. Moreover, in some cases, as the temperature goes up, the reaction rate accelerates so rapidly that explosion may suddenly occur, and therefore it is necessary to quickly control the temperature in such chemical reaction as mentioned above.

To control the temperature in this type of exothermic chemical reaction, conventionally, an integral-type chemical reaction apparatus has been known which controls the temperature by providing a temperature regulating jacket having both cooling and heating means in itself on the circumference of the reaction vessel and increasing or decreasing the temprature of a heat transfer medium flowing through the jacket. However, this apparatus performing both cooling and heating of the vessel through a sole heat transfer medium has been found inconvenient to use in that it can not quickly control the temperature because of poor reversal function of the temperature switching control from cooling to heating or vice versa.

Thus, to improve the aforesaid inconvenience, a chemical reaction apparatus separately having cooling and heating means has been proposed. As a result, such a separate-type apparatus as mentioned above has been invented as disclosed in the Japanese Patent Publication No. 5-104002 which controls the temperature by heating the liquid agent in the vessel with a heater as well as cooling it with the contact area between the cooling medium and the exterior surface of the vessel changed by the ascent and descent of the cooling medium level making use of a liquid-level regulator connected to the bottom portion of the cooling jacket provided on the circumference of the vessel through a siphon and the like. However, this apparatus has been also found inconvenient to use in that it requires a wider space for installation owing to its tendency to become larger in size because it needs the liquid level regulator containing a siphon, etc. in addition to cooling means.

Also, the present inventor has also proposed another separate-type chemical reaction apparatus (refer to the specification of the EPC Patent Application No. 415618 in the name of the present applicant) which controls the temperature by cooling the liquid agent by means of the cooling jacket provided on the upper circumference of the vessel as well as heating it with the contact area between warm water in a heating tank provided on the downside of the vessel and the exterior surface at the lower portion of the vessel changed by the vertical movement of the heating tank. However, this apparatus has been found inconvenient to use as well in that it can not properly respond to sudden change of the temperature in the vessel because it needs mechanical motion to move said tank vertically.

Furthermore, any of the aforesaid chemical reaction apparatus has been found inconvenient to use in that it is necessary to precisely set up such external conditions as the temperature, flow rate and others of heat transfer medium such as cooling and warm water, etc. so that the production expenses like personnel cost may greatly increase because such a setup job as mentioned above takes a lot of time and labor.

Accordingly, taking the aforesaid inconveniences encountered in conventional chemical reaction apparatus into account, the object of the present invention is to provide a reaction heat control mechanism of heat exchange area regulation type in a chemical reaction apparatus which can quickly and properly respond to chemical reaction experiencing sudden temperature change.

Also, another object of the present invention is to provide a reaction heat control mechanism of heat exchange area regulation type in a chemical reaction apparatus which can easily control the ascent and descent of the cooling medium level in the cooling jacket making use of cooling means having a very simple structure without need to occupy a wider placement space.

Another object of the present invention is to provide a reaction heat control mechanism of heat exchange area regulation type in a chemical reaction apparatus which can easily and stably control the temperature without need to make a complex and highly precise setup of those external conditions for the heat transfer medium making use of such a simple temperature control system as balancing heating quantity with cooling quantity.

The further object of the present invention is to provide a reaction heat control mechanism of heat exchange area regulation type in a chemical reaction apparatus which is excellent in operation efficiency in that it can precisely grasp the completion of chemical reaction which is very hard to decide just by observing the cooling medium level in the cooling jacket with bare eyes.

DISCLOSURE OF THE INVENTION

With a reaction heat control mechanism of conventional chemical reaction apparatus, it has been difficult to quickly and properly respond to chemical reaction experiencing sudden temperature change, and even if it might have responded to that change, there has been a problem in which the structure of the apparatus to realize it has become very complex. Thus, to solve this problem, the present invention has adopted such a technical means as a reaction heat control mechanism of heat exchange area regulation type in a chemical reaction apparatus comprising: a reaction vessel in which a liquid agent to be reacted is received; a heater to heat said agent in this vessel; a cooling jacket which is an airtight container surrounding the outer circumference of said vessel and in and out of which a cooling medium flows; a temperature controller to calculate a liquid level of a cooling medium in a real-time manner which is necessary for lowering the temperature of the liquid agent on the basis of a current temperature signal transmitted from a temperature sensor provided in said vessel and output a required temperature regulating signal; and a cooling medium liquid-level controller to regulate and change the volume of a gas in said cooling jacket, and being characterized in that it controls the reaction heat of the liquid agent by increasing or decreasing a contact area between an exterior surface of the vessel and the cooling medium in such a manner that the cooling medium liquid-level rises or lowers according to the volume of the gas supplied in the cooling jacket or exhausted therefrom by reversibly driving a pump so as to switch the gas passage on the basis of the temperature regulating signal output from the temperature controller.

Thereby, it becomes possible not only to excellently respond to sudden temperature change of the liquid agent in the vessel and regulate it in a quick and appropriate manner but also to stably maintain the speed of chemical reaction so as to restrain its excessive reaction, with the result that the safety measures may improve at the same time. Also, since such a temperature regulating method as mentioned above adopts a very simple and straightforward cooling mechanism where the cooling medium level in the cooling jacket is controlled to rise or lower making a skillful use of complementary behavior of cooling quantity by means of the supply or exhaustion of the gas, it becomes possible not only to make the apparatus compact in size so as to save a space for installation but also to place the pump, motor and so forth to make this cooling means operate far from the reaction vessel which is prone to invite dangerous accidents.

Moreover, with the adoption of such a simple temperature regulating method as balancing heating quantity with cooling quantity, it is unnecessary to make a complex and highly precise setup job for heat transfer media and also since the completion of chemical reaction can be correctly grasped just by observing the cooling medium level in the cooling jacket, it never occurs that it will waste precious time after its completion. As a result, it becomes possible to greatly improve operation efficiency and reduce production cost.

BEST MODE FOR CARRYING OUT THE INVENTION

Figure 1:
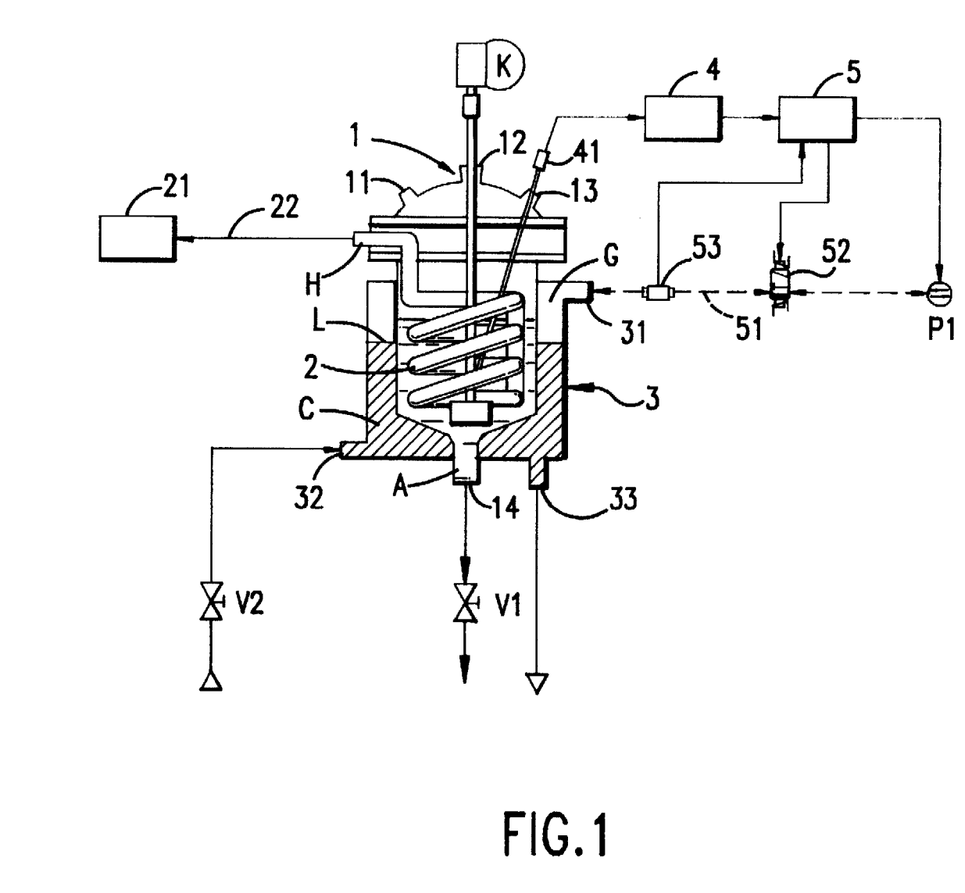
FIG. 1 is a block diagram to show the basic mechanism of the chemical reaction apparatus in the first embodiment structured through the application of the present invention.
Figure 2:
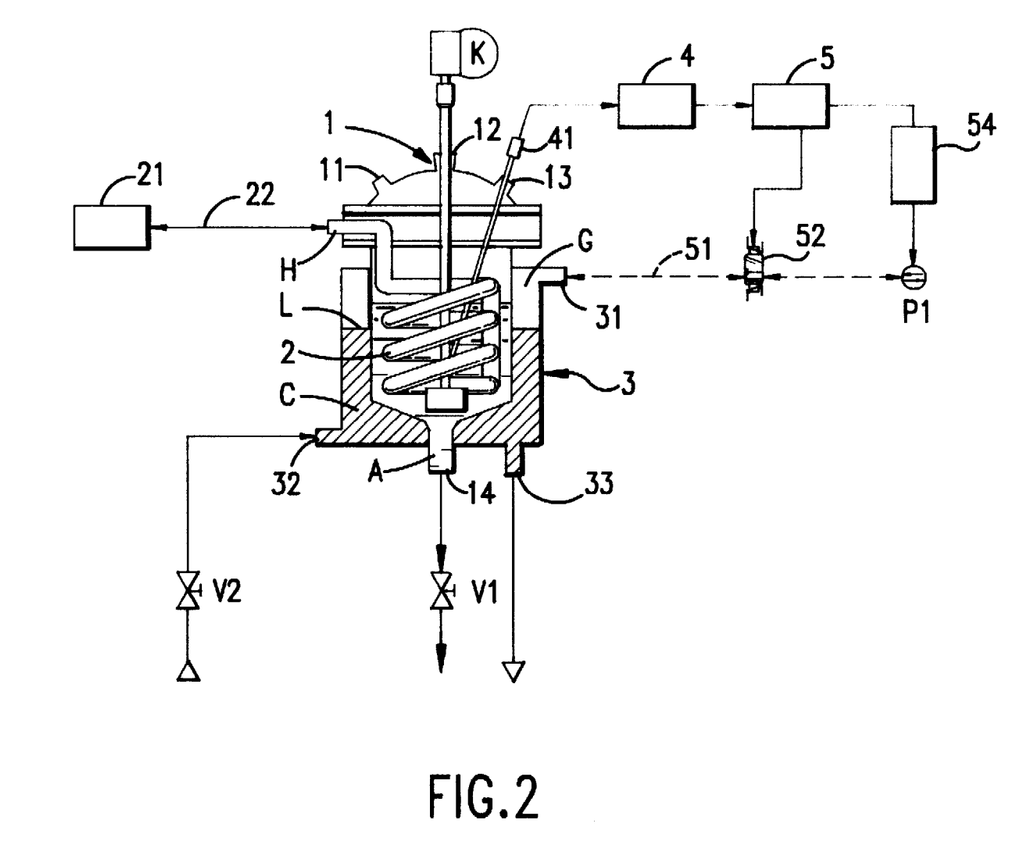
FIG. 2 is a block diagram to show the basic mechanism of the chemical reaction apparatus in the second embodiment structured through the application of the present invention.
Figure 3:
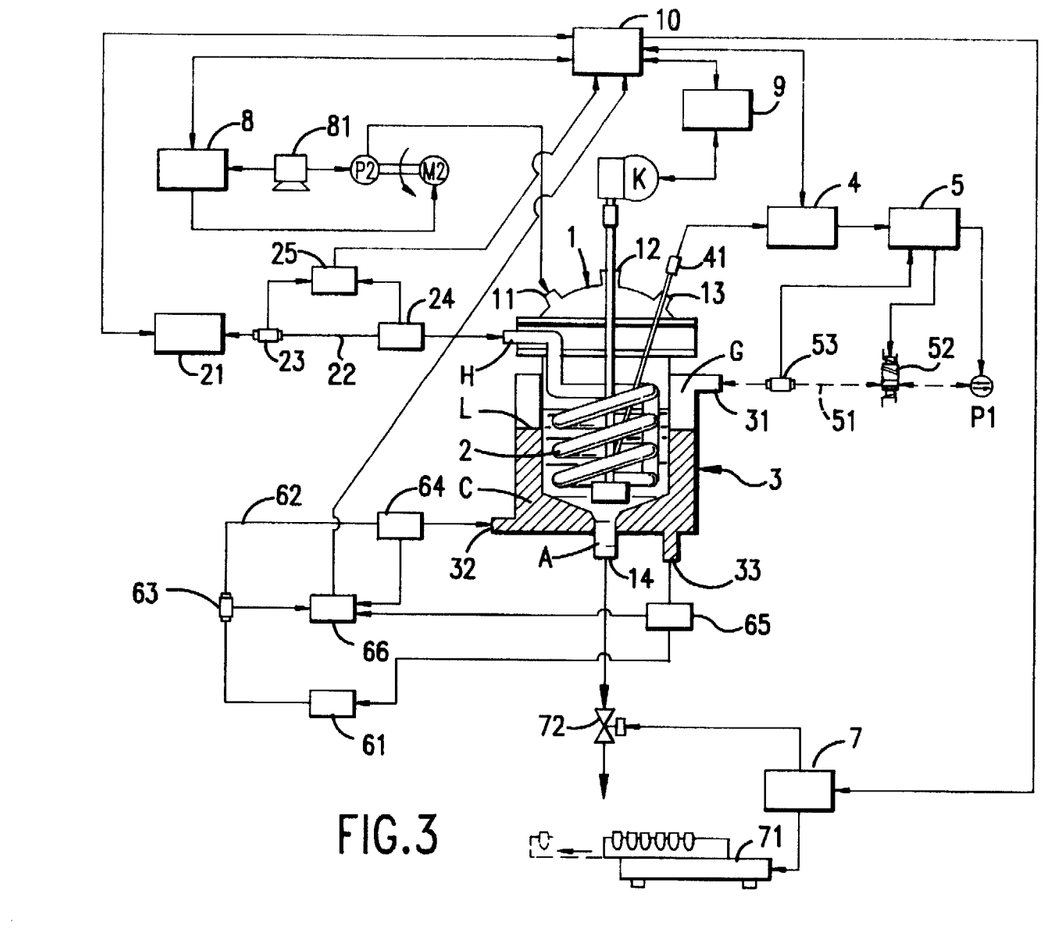
FIG. 3 is a block diagram to show the mechanism of the chemical reaction apparatus in the third embodiment structured through the additon of optional parts to the apparatus of the first embodiment.

Hereinafter, the present invention will be described in details on the basis of the first to the third embodiments shown in the accompanying drawings. In FIGS. 1 to 3, a thin line indicates a signal line, a bold line indicates a passage of both a heating and a cooling medium and a dotted line indicates an air passage.

(FIRST EMBODIMENT)

Firstly, the basic mechanism of the chemical reaction apparatus in the first embodiment structured through the application of the present invention will be described in reference to FIG. 1. Numeral (1) indicates a reaction vessel capable of receiving a liquid agent (A) to be reacted therein and three upper openings (11), (12) and (13) are provided on the upper part thereof while a lower opening (14) is provided on the lower part thereof. The liquid agent (A) is put into the opening (11) of the reaction vessel (1) and a stirrer (K) is inserted into the opening (12) thereof and a temperature sensor (41) in a thermocouple type is inserted into the opening (13) to meter the temperature of the liquid agent (A). And the opening (14) at the lower part of the vessel (1) is connected to a valve (V1) and a sampling of the agent (A) contained in the vessel (1) can be collected by opening the valve (V1) if necessary.

Numeral (2) indicates a heater made of a pipe formed into a spiral shape and placed inside the vessel (1). It is possible to heat the liquid agent (A) in said vessel (1) by circulating a heating medium (H) through the pipe. Warm water is normally used for the heating medium (H). The circulation of said warm water is arranged so that it may run through said heater (2) at a fixed speed by way of a heating medium passage (22) from a heating medium supply device (21). Namely, the warm water circulates through said heater (2) with its temperature and flow rate maintained at fixed values and gives heat to the agent (A) in the vessel (1).

Numeral (3) indicates a cooling jacket acting as an airtight vessel which surrounds the outer circumference of the received portion of the liquid agent placed at the lower part of the reaction vessel (1), said cooling jacket (3) having an inflow vent (32) to supply a cooling medium (C) and an outflow vent (33) to discharge said cooling medium (C) as well as having a supply and exhaust vent (31) to change the volume of a gas in said airtight vessel. Water at a regular temperature such as tap water and the like is usually used for the cooling medium (C) and said water is supplied from the inflow vent (32) into the cooling jacket (3). While the chemical reaction of the liquid agent (A) in the reaction vessel (1) proceeds, water at a substantially regular temperature continues to flow from the inflow vent (32) to the outflow vent (33) through the cooling jacket (3).

Numeral (4) is a temperature controller to input the present temperature signal output by a temperature sensor (41) inserted into said reaction vessel (1) and to calculate a liquid level (L) of the cooling medium (C) in a real-time manner which is necessary to lower the temperature of the liquid agent (A) on the basis of said present temperature signal so as to output a required temperature regulating signal.

Numeral (5) indicates a supply and exhaust volume change mechanism to change and regulate the volume of a gas (G) in the cooling jacket (3) through an air passage (51) connected to the supply and exhaust vent (31) of said jacket (3), namely, a cooling medium liquid-level controller raising or lowering the liquid level (L) of the cooling medium (C) in said cooling jacket (3) according to the volume of said gas (G) capable of controlling the reaction heat of the liquid agent (A) in said reaction vessel (1) by increasing or decreasing a contact area between an exterior surface of the vessel (1) and the cooling medium (C), namely, a heat exchange area. The temperature regulating signal output by said temperature controller (4) is entered into said cooling medium liquid-level controller (5). A motor (M1) integrated into a pump (P1) reversibly rotates on the basis of said temperature regulating signal so as to actuate said pump (P1) as well as to switch a gas passage through a control valve (52). And a required volume of the gas (G) is supplied into or exhausted from the supply and exhaust vent (31) of said cooling jacket (3). A reversible constant delivery air pump or a positive displacement air pump is used for the pump (P1), but it is possible to adopt the aforesaid pump (31) not only in a motor-integrated type but also in a motor-separate type. Also, an electromagnetic valve is used for the control valve (52) to switch a reciprocating passage of the gas. Since such an extremely simple mechanism is adopted as mentioned above making use of the gas (G) passage switching by means of the pump (P1), it requires less installation space than the conventional chemical reaction apparatus which use a liquid-level regulator containing a siphon and the like.

Then, as for the liquid level (L) of the cooling medium (C) which rises or lowers according to the volume of the gas (G) supplied into or exhausted from the supply and exhaust vent (31) of the cooling jacket (3), it is controlled as follows.

In the first place, once the chemical reaction of the liquid agent (A) in the reaction vessel (1) starts, heat of reaction is generated so as to raise the temperature in said vessel (1). In order to restrain the temperature from rising too much, a required amount of the gas (G) sealed in the upper part of the cooling jacket (3) is exhausted from the supply and exhaust vent (31) by switching the control valve (52) to the direction of exhaust on the basis of the signal output from the cooling medium liquid-level controller (5). And then, the volume of the cooling medium (C) corresponding to that of the gas (G) exhausted from the vent flows into the cooling jacket (3) of an airtight vessel so as to complementarily raise the liquid level (L) of the cooling medium (C). As a result, a contact area between the exterior surface of the vessel (1) and the cooling medium (C) increases, and thereby the heat of reaction of the liquid agent (A) can be restrained. While the chemical reaction proceeds, the aforesaid liquid level (L) is maintained at a high level because the heat of reaction occurs with time, unless the chemical reaction is an endothermic reaction. And because the heat of reaction hardly occurs at the completion of the chemical reaction, keeping the liquid level (L) as high as it was causes the temperature in said vessel (1) to lower. However, in the present embodiment, the cooling medium liquid-level controller (5) outputs a cooling medium control signal so as to switch the control valve (52) to the direction of supply and the pump (P1) supplies only a required amount of the gas (G) into the cooling jacket (3) through the supply and exhaust vent (31). And then, only the volume of the cooling medium (C) corresponding to that of the gas (G) supplied into the cooling jacket (3) is discharged from the outflow vent (33) so as to lower the liquid level (L) of the cooling medium (C). As a result, since the contact area between the exterior surface of the vessel (1) and the cooling medium (C) decreases, heat quantity generated by the heater (2) and endothermic quantity by means of the cooling jacket (3) equilibrate so as to keep the temperature in the vessel (1) at a constant value. And also, the response to sudden temperature change in the vessel becomes extremely quick and proper because a feedback control for the liquid level (L) is performed in the present embodiment in such a manner that the flow rate of the gas (G) is measured by a flow meter (53) installed on the air passage (51) in a real-time manner and the measured value is entered into the cooling medium liquid-level controller (5) so that the volume of the gas (G) calculated on the basis of said value may be supplied into or exhausted from the cooling jacket (3).

(SECOND EMBODIMENT)

The basic mechanism of the chemical reaction apparatus in the second embodiment structured through the application of the present invention will be described on the basis of FIG. 2. The present embodiment is almost the same as the first embodiment, but the former is different from the latter in that the former adopts a potentiometer (54) instead of the flow meter (53) in relation to the cooling medium liquid-level controller (5) system. In the present embodiment, the temperature regulating signal output by the temperature controller (4) is entered into the cooling medium liquid-level controller (5). On the basis of said temperature regulating signal, the value of the potentiometer (54) changes and a motor (M1') integrated into the potentiometer (54) reversibly rotates only by potential difference caused by the value change so as to actuate the pump (P1) by means of the motor (M1) engaged with said motor (M1') as well as to perform a gas passage switching through the control valve (52). And a required amount of the gas (G) is supplied into or exhausted from the supply and exhaust vent (31). Thereby, the liquid level (L) rises or lowers only by the volume of the cooling medium (C) corresponding to that of the gas (G) supplied into or exhausted from the vent (31). Although a motor-integrated type is used for the potentiometer (54) as well as the pump (P1) in the present embodiment, it is also possible to adopt a motor-separate type. As for the control of the liquid level (L) as mentioned above, it is unnecessary to stabilize the level (L) within an absolute range to the vertical direction of the cooling jacket (3), but it is good enough only if the level (L) rises or lowers within a relative range against the level (L) at present.

(THIRD EMBODIMENT)

Furthermore, the mechanism of the chemical reaction apparatus in the third embodiment structured through the addition of optional parts to the apparatus in the first embodiment will be described on the basis of FIG. 3. The optional parts include a heating means, a cooling means, an automatic sampling controller (7), a liquid agent dropping controller (8), a stirrer torque controller (9), a computer (10) and others.

In the first place, a heating means comprises a heating medium supply device (21), a heating medium passage (22), a flow meter (23), a temperature sensor (24) and a heating value calculation unit (25). A heating medium (H) supplied from the heating medium supply device (21) circulates inside a reaction vessel (1) through the passage (22). At that time, the flow rate and temperature of said heating medium (H) are measured by the flow meter (23) as well as the temperature sensor (24) in a real-time manner and the measured values are entered into the heating value calculation unit (25) so as to perform the calculation of the heating value on the basis of the input data. Secondly, a cooling means comprises a cooling medium supply device (61), a cooling medium passage (62), a flow meter (63), temperature sensors (64) and (65), and a cooling value calculation unit (66). A cooling medium (C) supplied from the cooling medium supply device (61) is supplied to an inflow vent (32) of a cooling jacket (3) through the passage (62) and is exhausted from an outflow vent (33) through the cooling jacket (3). At that time, the flow rate and temperature of said cooling medium (C) are measured by the flow meter (63) as well as the temperature sensors (64) and (65) in a real-time manner and the measured values are entered into the cooling value calculation unit (66) so as to perform the calculation of the cooling value on the basis of the input data. The automatic sampling controller (7) consists of an automatic carry table (71) and a sampling valve (72). An electromagnetic valve is used for the sampling valve (72) and is opened for a fixed time at a predetermined hour by a timer. And then, a required amount of the liquid agent (A) in the reaction vessel (1) is collected in a sampling container placed on the automatic carry table (71) and empty sampling containers are arranged at a predetermined place one after another. The liquid agent dropping controller (8) comprises an electronic scale (81), a motor (M2) and a pump (P2). The motor (M2) rotates just at a required revolving speed on the basis of the signal transmitted from the dropping controller (8) so as to drive the pump (P2) and drop a required amount of the liquid agent (A) into an upper opening (11) of the reaction vessel (1) from a raw material container mounted on the electronic scale (81). The amount of the liquid agent (A) dropped from the container is entered into the liquid agent dropping controller (8). The stirrer torque controller (9) reads stirring torque from a stirrer (K) in a real- time manner and outputs an alarm signal when it detects something unusual in the torque. Thereby, it becomes possible to easily detect the change of the viscosity of the liquid agent (A) in the reaction vessel (1) and to prevent the agent (A) from gelling, for instance. Lastly, the computer (10) collects various items of information from each and every controller and performs the necessary calculation in order to output a required control signal to each and every controller, for instance, like outputting the flow rate and temperature of the heating medium (H) to the heating medium supply device (21); inputting a heating value from the heating value calculation unit (25); inputting a cooling value from the cooling value calculation unit (66) and also outputting a sampling order signal to the automatic sampling controller (7); outputting the dropped amount of the liquid agent (A) to the liquid agent controller (8); and outputting a signal to show something wrong in the torque to each and every controller when inputting an alarm signal to indicate trouble in the torque from the stirrer torque controller (9). In this way, by virtue of the computer (10), it becomes possible to more efficiently and safely operate the chemical reaction apparatus on the whole.

(EXPERIMENT)

Hereinafter, the chemical reaction experiment by means of the apparatus in the first embodiment will be described on the basis of FIG. 4. The experiment begins with putting such reagents as water, a monomer (vinyl acetate) and an emulsifier (lauryl sodium sulfate) into the reaction vessel (1) so as to observe emulsion polymerization reaction. Then, the temperature of a heating medium (H) is set a little higher than the regular temprature (60° C. for the present experiment) while the flow rate of a cooling medium (C) is set at 300 cc/min. so that the temperature in the vessel (1) may rise up to 62° C. At this point, by putting an initiator (potassium persulfate) into said vessel (1), the temperature control by means of the apparatus in the first embodiment starts.

Thereafter, a sampling is collected by opening a valve (V1) placed at the bottom portion of the vessel (1) in order to check polymerization rate. Since heat of reaction comes not to occur any more at the completion of polymerization reaction, the liquid level (L) of the cooling medium (C) suddenly lowers and then becomes stable. Thereat, the experiment of emulsion polymerization reaction comes to an end.

Figure 4:
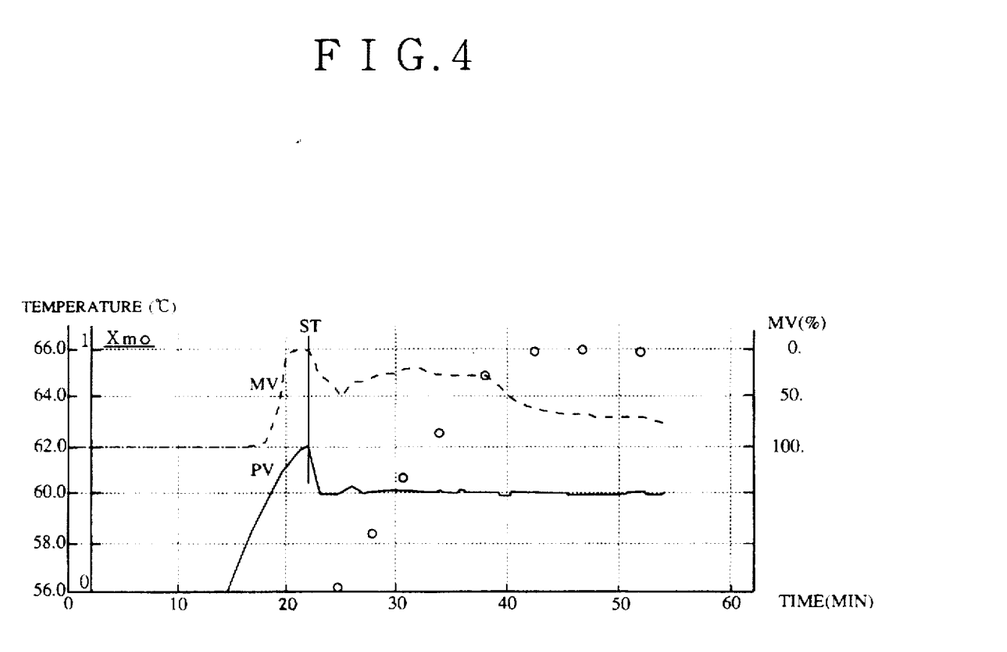
FIG. 4 is a graph to show the temperature, liquid-level, polymerization rate, etc. in the experiment of the chemical reaction by the apparatus in the first embodiment.

As mentioned above, as a result of the emulsion polymerization reaction experiment, the data as shown in FIG. 4 have been obtained. In FIG. 4, a solid line (PV) indicates the temperature in the vessel (1) and a dotted line (MV) indicates the liquid level (L) of the cooling medium (C) while a circle mark (Xm) indicates polymerization rate and a vertical line (ST) indicates the time when the initiator has been put into the vessel. Then, a transverse axis of the graph shows time while a vertical axis thereof shows three variables; temperature, polymerization rate and liquid level. The scale notched on the left side of the graph indicates temperature and that on the right side of said scale indicates polymerization rate while that on the right side of the graph indicates liquid level. The polymerization rate is represented with the value from 0 to 1 in which 0 shows that the reaction is yet to start and 1 shows that it has come to an end. The liquid level is represented within the range of 0% to 100% in which 0% shows that the liquid level of the cooling medium (C) in the cooling jacket (3) is at highest and 100% shows that said level is at lowest. As clarified by the experiment data in FIG. 4, although the temperature in the reaction vessel (1) temporarily rises owing to heat of reaction generated after the administration of the initiator, the liquid level (L) of the cooling medium (C) rises quickly responding to the temperature rise in the vessel (1) so as to reduce the temperature to the stable level in no time and thereafter the temperature is to be controlled within the range of the regular temperature (60°)±0.05° C. Also, it can be seen from the graph that there occurs sudden descent of the liquid level (L) in the vicinity of forty minutes' lapse of time, and it shows that heat of reaction has come not to occur any more because of the completion of the polymerization reaction, so that it may become possible to correctly grasp the completion of the polymerization reaction in an indirect manner by the observation of the liquid level.

For the apparatus embodied in the present invention, since such an extremely simple temperature control system is adopted as balancing heating quantity generated by heat of reaction and a heating medium with cooling quantity generated by a cooling medium by means of heat exchange area regulation, it can easily maintain stable temperature control without making a complex and highly precise setting job for heat transfer media such as a heating medium, a cooling medium and so forth. Also, work efficiency of the persons in charge of the experiment greatly improves because such a time-consuming job as mentioned above can be avoided.

The examples embodied in the present invention have been generally described as mentioned above, but it should be understood that the present invention is not limited to the aforesaid examples but can be modified in various ways within the scope of the accompanying patent claims. For instance, regarding a gas supply and exhaust passage switching system, it is also possible to perform switching instead of using the control valve by reversibly driving a reversible constant delivery air pump or by adopting two constant delivery air pumps one of which is exclusively used for supply and the other of which is exclusively used for exhaust. And it is also possible to increase heat exchange area in which the cooling medium contacts with the exterior surface of the reaction vessel by forming said surface in an uneven shape. It is needless to say that any of the aforesaid different modes also lies in the technical scope of the present invention.

INDUSTRIAL APPLICABILITY

As having been described above, according to a reaction heat control mechanism of heat exchange area regulation type in the present invention, since it is possible to properly and quickly control heat of reaction generated when carrying out experiments accompanying chemical reaction such as polymerization and condensation, etc., it is especially useful to secure safe temperature control of the chemical reaction experiencing sudden temperature change. Furthermore, it is applicable not only to a chemical reaction apparatus on a trial basis but also to a chemical reaction apparatus in a large-scale chemical plant capable of mass-producing industrial materials such as plastics.

What is claimed is:

1. A reaction heat control mechanism of heat exchange area regulation type in a chemical reaction apparatus, the control mechanism comprising;

a reaction vessel (1) for receiving a liquid agent (A) to be reacted, a heater (2) provided in this reaction vessel (1), said heater (2) heating the liquid agent (A) in the reaction vessel (1) by passing a heating medium (H) from a heating medium supply device (21), a cooling jacket (3) acting as an airtight vessel for surrounding the outer circumference of at least the receiving portion of the liquid agent (A) in the reaction vessel (1), said cooling jacket (3) having an inflow vent (32) for supplying a cooling medium (C) and an outflow vent (33) for discharging the cooling medium (C) as well as having a supply and exhaust vent (31) for changing a gas volume in the airtight vessel, a temperature controller (4) for calculating a liquid level (L) of the cooling medium (C) necessary to reduce the temperature of the liquid agent (A) in a real-time manner on the basis of the present temperature signal from a temperature sensor (41) installed in the reaction vessel (1) and outputting a required temperature regulating signal, and a cooling medium liquid-level controller (5) acting as a supply and exhaust change mechanism for changing and regulating the volume of a gas (G) in the cooling jacket (3) through a passage (51) connected to the supply and exhaust vent (31) of the cooling jacket (3), said liquid-level controller (5) controlling the reaction heat of the liquid agent (A) in the reaction vessel (1) in such a manner that a passage switching is performed by reversibly driving a pump (P1) on the basis of the temperature regulating signal output from the temperature controller (4) and thereby the volume of the cooling medium (C) flowing in and out of the cooling jacket (3) is complementarily increased or decreased to raise or lower the liquid level (L) in response to the volume of the gas (G) supplied in or exhausted from the cooling jacket (3) through the vent (31) resulting in increasing or decreasing a contact area of the cooling medium (C) with the outer surface of the reaction vessel (1).

2. A reaction heat control mechanism of heat exchange area regulation type in a chemical reaction apparatus, the control mechanism comprising;

a reaction vessel (1) for receiving a liquid agent (A) to be reacted, a heater (2) provided in this reaction vessel (1), said heater (2) heating the liquid agent (A) in the reaction vessel (1) by passing a heating medium (H) from a heating medium supply device (21), a cooling jacket (3) acting as an airtight vessel for surrounding the outer circumference of at least the receiving portion of the liquid agent (A) in the reaction vessel (1), said cooling jacket (3) having an inflow vent (32) for supplying a cooling medium (C) and an outflow vent (33) for discharging the cooling medium (C) as well as having a supply and exhaust vent (31) for changing a gas volume in the airtight vessel, a temperature controller (4) for calculating a liquid level (L) of the cooling medium (C) necessary to reduce the temperature of the liquid agent (A) in a real-time manner on the basis of the present temperature signal from a temperature sensor (41) installed in the reaction vessel (1) and outputting a required temperature regulating signal, and a cooling medium liquid-level controller (5) acting as a supply and exhaust change mechanism for changing and regulating the volume of a gas (G) in the cooling jacket (3) through a passage (51) connected to the supply and exhaust vent (31) of the cooling jacket (3), said liquid-level controller (5) controlling the reaction heat of the liquid agent (A) in the reaction vessel (1) in such a manner that a passage switching through a control valve (52) is performed by reversibly driving a pump (P1) on the basis of the temperature regulating signal output from the temperature controller (4) and a feedback signal from a flow meter (53) provided in the passage (51) and thereby the volume of the cooling medium (C) flowing in and out of the cooling jacket (3) is complementarily increased or decreased to raise or lower the liquid level (L) in response to the volume of the gas (G) supplied in or exhausted from the cooling jacket (3) through the vent (31) resulting in increasing or decreasing a contact area of the cooling medium (C) with the outer surface of the reaction vessel (1).

3. A reaction heat control mechanism of heat exchange area regulation type in a chemical reaction apparatus, the control mechanism comprising;

a reaction vessel (1) for receiving a liquid agent (A) to be reacted, a heater (2) provided in this reaction vessel (1), said heater (2) heating the liquid agent (A) in the reaction vessel (1) by passing a heating medium (H) from a heating medium supply device (21), a cooling jacket (3) acting as an airtight vessel for surrounding the outer circumference of at least the receiving portion of the liquid agent (A) in the reaction vessel (1), said cooling jacket (3) having an inflow vent (32) for supplying cooling medium (C) and an outflow vent (33) for discharging the cooling medium (C) as well as having a supply and exhaust vent (31) for changing a gas volume in the airtight vessel, a temperature controller (4) for calculating a liquid level (L) of the cooling medium (C) necessary to reduce the temperature of the liquid agent (A) in a real-time manner on the basis of the present temperature signal from a temperature sensor (41) installed in the reaction vessel (1) and outputting a required temperature regulating signal, and a cooling medium liquid-level controller (5) acting as a supply and exhaust change mechanism for changing and regulating the volume of a gas (G) in the cooling jacket (3) through a passage (51) connected to the supply and exhaust vent (31) of the cooling jacket (3), said liquid-level controller (5) controlling the reaction heat of the liquid agent (A) in the reaction vessel (1) in such a manner that a passage switching through a control valve (52) is performed by reversibly driving a pump (P1) on the basis of a variation signal generated by varying a potentiometer (54) in accordance with the temperature regulating signal output from the temperature controller (4) and thereby the volume of the cooling medium (C) flowing in and out of the cooling jacket (3) is complementarily increased or decreased to raise or lower the liquid level (L) in response to the volume of the gas (G) supplied in or exhausted from the cooling jacket (3) through the vent (31) resulting in increasing or decreasing a contact area of the cooling medium (C) with the outer surface of the reaction vessel (1).

* * * * *